United States Patent
Lee et al.

(10) Patent No.: US 10,511,005 B2
(45) Date of Patent: Dec. 17, 2019

(54) BATTERY PACK AND VEHICLE CONTAINING BATTERY PACK

(71) Applicant: LG CHEM, LTD., Seoul (KR)

(72) Inventors: Chang-Bok Lee, Daejeon (KR); Jin-Hyung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 11 days.

(21) Appl. No.: 15/743,834

(22) PCT Filed: May 12, 2016

(86) PCT No.: PCT/KR2016/005024
§ 371 (c)(1),
(2) Date: Jan. 11, 2018

(87) PCT Pub. No.: WO2017/094983
PCT Pub. Date: Jun. 8, 2017

(65) Prior Publication Data
US 2018/0205058 A1  Jul. 19, 2018

(30) Foreign Application Priority Data

Nov. 30, 2015  (KR) .................. 10-2015-0168276

(51) Int. Cl.
*H01M 2/20* (2006.01)
*H01M 2/10* (2006.01)

(52) U.S. Cl.
CPC ............... *H01M 2/20* (2013.01); *H01M 2/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 7,815,448 B2 | 10/2010 | Kawai et al. |
| 8,125,192 B2 | 2/2012 | Yoon et al. |
| 8,854,797 B2 | 10/2014 | Ikeda et al. |
| 9,299,975 B2 | 3/2016 | Furuya et al. |
| 2011/0101920 A1 | 5/2011 | Seo et al. |
| 2014/0193990 A1 | 7/2014 | Zhao et al. |

FOREIGN PATENT DOCUMENTS

| | | |
|---|---|---|
| EP | 2 355 205 A1 | 8/2011 |
| JP | 2002-343331 A | 11/2002 |
| JP | 2012-186016 A | 9/2012 |
| JP | 2012-186074 A | 9/2012 |
| JP | 2013-26059 A | 2/2013 |
| KR | 10-2008-0047639 A | 5/2008 |
| KR | 10-2009-0052520 A | 5/2009 |
| KR | 10-2009-0084656 A | 8/2009 |
| KR | 10-2011-0048001 A | 5/2011 |
| KR | 10-2015-0104603 A | 9/2015 |

OTHER PUBLICATIONS

International Search Report issued in PCT/KR2016/005024 (PCT/ISA/210), dated Sep. 2, 2016.

*Primary Examiner* — Wojciech Haske
(74) *Attorney, Agent, or Firm* — Birch, Stewart, Kolasch & Birch, LLP

(57) ABSTRACT

Disclosed is a battery pack, which includes a pack case forming an appearance of the battery pack, a battery module assembly provided in the pack case and having at least one battery module, and a service plug configured to electrically connect the battery module assembly or cut off the electric connection of the battery module assembly, the service plug having a plug bus bar directly connected to the battery module assembly.

18 Claims, 10 Drawing Sheets

BATTERY PACK AND VEHICLE CONTAINING BATTERY PACK

TECHNICAL FIELD

The present disclosure relates to a battery pack and a vehicle containing the battery pack.

The present application claims priority to Korean Patent Application No. 10-2015-0168276 filed on Nov. 30, 2015 in the Republic of Korea, the disclosures of which are incorporated herein by reference.

BACKGROUND ART

A secondary battery, which is easily applied to various product groups and has electrical characteristics such as high energy density, is universally applied not only for a portable device but also for an electric vehicle (EV) or a hybrid electric vehicles (HEV), an energy storage system or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by adding other components to a battery module assembly including at least one battery module.

The battery pack mounted to a vehicle such as an electric vehicle includes a service plug that may cut off the electric connection of the battery pack in order to prevent an electric shock or the like of a worker when the worker inspects or manages the battery pack.

The service plug is also called a safety plug or a manual service disconnect (MSD), and is mounted to the battery pack as a component for electrically connecting the battery module assembly in the battery pack or for cutting off the electric connection of the battery module assembly. When inspecting or managing the battery pack, a worker or the like firstly manipulates the service plug to cut off the electric connection inside the battery pack and then inspects or manages the battery pack, in order to prevent electric shock or the like.

A conventional battery pack includes a plurality of cables having a predetermined length and electrical components in a pack case for the electric connection of the service plug and the battery module assembly. In addition, the conventional battery pack additionally includes separate fixing parts for fixing the plurality of cables and the electrical components in the pack case.

However, the conventional battery pack needs a complicated assembling process due to the plurality of cables, the electric components and the fixing parts for mounting the service plug, which increases the manufacturing cost of the battery pack and thus lowers the price competitiveness.

In addition, the conventional battery pack needs an additional space in the pack case in order to mount these components, which however deteriorates the space efficiency inside the pack case and increases the size of the battery pack.

Moreover, in the conventional battery pack, the energy density of the battery pack is lowered as much as the additional space with the same size, and thus the capacity and output of the battery pack are reduced with the same size.

Therefore, it is required to find a way to provide a battery pack and a vehicle containing the battery pack which may improve the efficiency of the assembling process, secure the price competitiveness, and improve the space efficiency inside the pack case, when the service plug is installed to the battery pack.

DISCLOSURE

Technical Problem

The present disclosure is designed to solve the problems of the related art, and therefore the present disclosure is directed to providing a battery pack and a vehicle containing the battery pack, which may improve the efficiency of the assembling process, secure the price competitiveness, and improve the space efficiency inside a pack case, when a service plug is installed to the battery pack.

Technical Solution

In one aspect of the present disclosure, there is provided a battery pack, comprising: a pack case forming an appearance of the battery pack; a battery module assembly provided in the pack case and having at least one battery module; and a service plug configured to electrically connect the battery module assembly or cut off the electric connection of the battery module assembly, the service plug having a plug bus bar directly connected to the battery module assembly.

The service plug may include: a plug body mounted to the pack case so that an upper portion thereof is disposed out of the pack case and a lower portion thereof is disposed inside the pack case; and a plug cover detachably mounted to the upper portion of the plug body, the plug cover electrically connecting the battery module assembly when being coupled to the plug body and cutting the electric connection of the battery module assembly when being separated from the plug body, wherein the plug bus bar is provided at the lower portion of the plug body and exposes out of the pack case when the plug cover is separated.

The plug body may have a bus bar opening provided above the plug bus bar to expose the plug bus bar when the plug cover is separated.

The plug bus bar may be coupled to the battery module assembly by means of at least one coupling member, and the at least one coupling member may pass through the bus bar opening when the plug bus bar and the battery module assembly are coupled.

The battery module assembly may include a module board for electrically connecting the at least one battery module, and the plug bus bar may be mounted directly to the module board.

The module board may include a bus bar mounting part on which the plug bus bar is placed, and the bus bar mounting part has at least one protruding member provided through the plug bus bar so as to be coupled to the at least one coupling member.

The plug bus bar may include: a first bus bar provided at one lower side of the plug body and mounted to the bus bar mounting part; and a second bus bar spaced from the first bus bar by a predetermined distance and mounted to the bus bar mounting part.

The bus bar mounting part may include: a first mounting part on which the first bus bar is placed, the first mounting part having a first protruding member provided through the first bus bar; and a second mounting part on which the second bus bar is placed, the second mounting having a second protruding member provided through the second bus bar.

The coupling member may be provided in a pair, and the pair of coupling members may include: a first coupling member coupled to the first protruding member; and a second coupling member coupled to the second protruding member.

The bus bar opening may include a first open hole provided above the first bus bar and allowing the first coupling member to pass therethrough; and a second open hole provided above the second bus bar and allowing the second coupling member to pass therethrough.

The first bus bar may have a through hole through which the first protruding member passes, and the second bus bar may have a through hole through which the second protruding member passes.

The plug body may include a bus bar support provided between the first bus bar and the second bus bar to support the first bus bar and the second bus bar.

The plug body may include at least one pair of connector slots disposed to face each other with the bus bar opening being interposed therebetween and electrically connected to the plug bus bar.

The plug cover may include at least one pair of connector terminals inserted into the at least one pair of connector slots when the plug cover is coupled to the plug body and detached from the at least one pair of connector slots when the plug cover is separated from the plug body.

The plug body may include a high-voltage connector spaced from the bus bar opening and electrically connected to the plug bus bar.

The plug cover may include a high-voltage terminal inserted into the high-voltage connector when the plug cover is coupled to the plug body.

The service plug may include a plug lever pivotally mounted to the plug cover to separate the high-voltage terminal from the high-voltage connector by the pivotal movement.

The plug body may include a resistor connector spaced from the bus bar opening to measure insulation resistance of the battery module assembly when the plug body is separated from the plug cover.

The battery module assembly may include a battery management system (BMS) board provided in the pack case to manage the at least one battery module and the module board, and the plug body may include a BMS connector electrically connected to the BMS board and disposed inside the pack case.

In another aspect of the present disclosure, there is provided a vehicle, comprising the battery pack according to the above embodiments.

Advantageous Effects

According to various embodiments as above, it is possible to provide a battery pack and a vehicle containing the battery pack, which may improve the efficiency of the assembling process, secure the price competitiveness, and improve the space efficiency inside the pack case, when the service plug is installed in the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
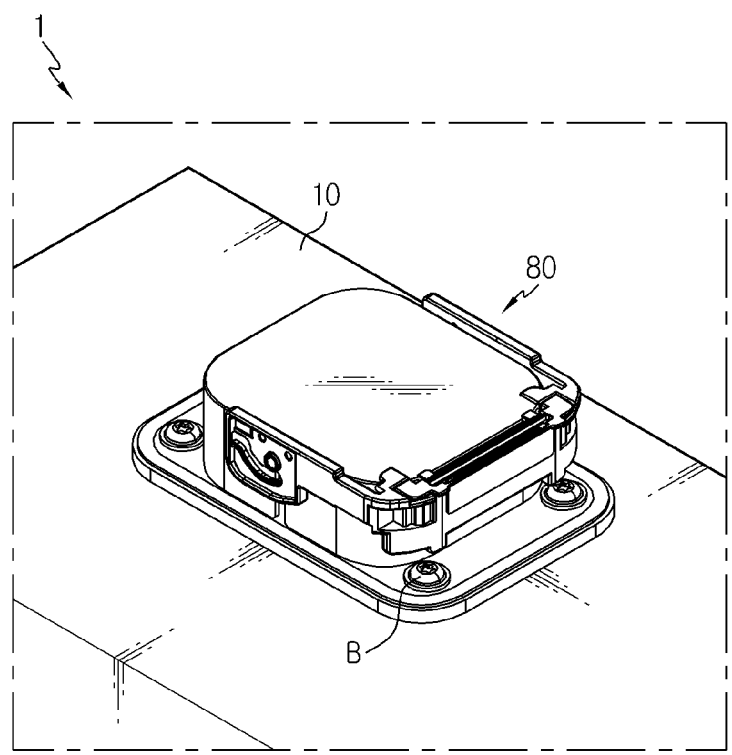
FIG. 1 is a diagram for illustrating a battery pack according to an embodiment of the present disclosure.
Figure 2:
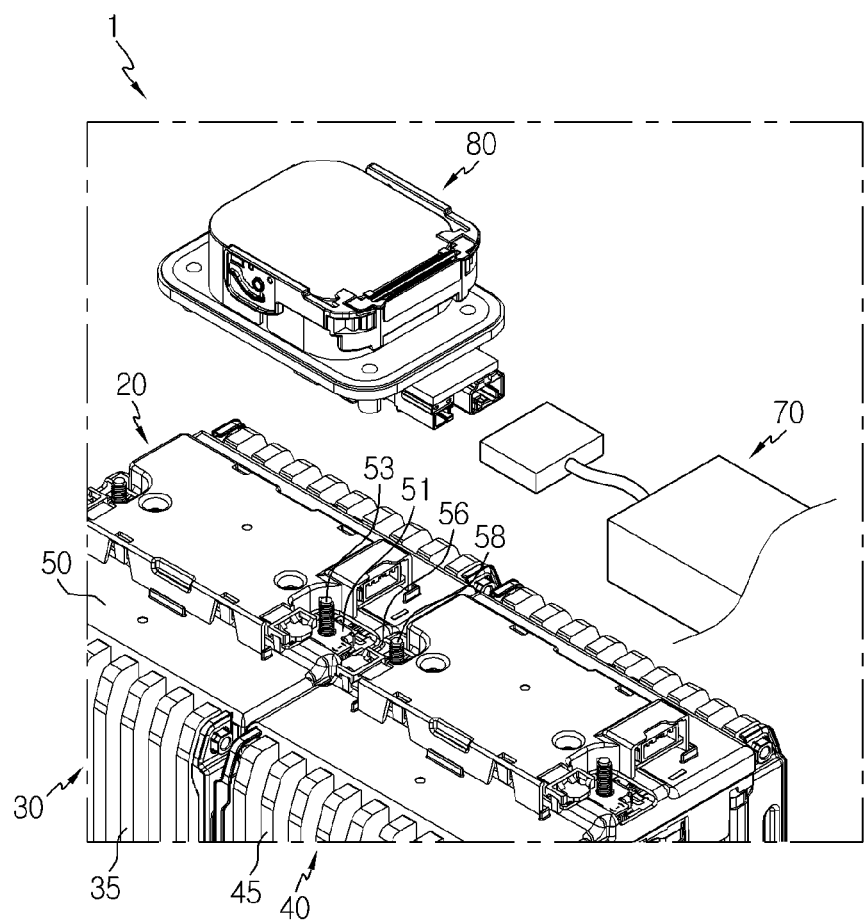
FIG. 2 is an exploded perspective view showing the battery pack of FIG. 1, from which a pack case is excluded.
Figure 3:
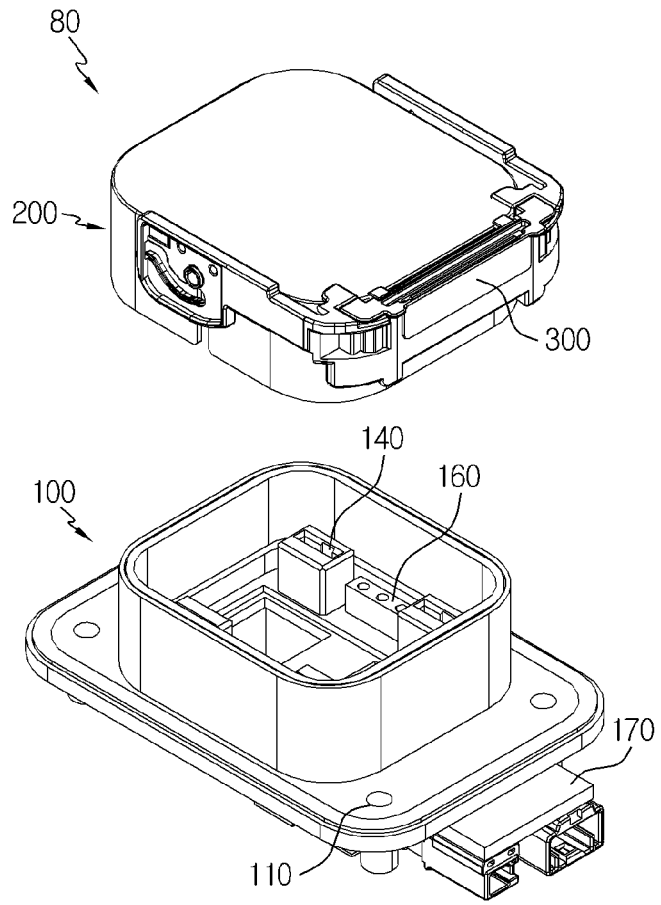
FIG. 3 is an exploded perspective view showing a service plug employed at the battery pack of FIG. 2.
Figure 4:
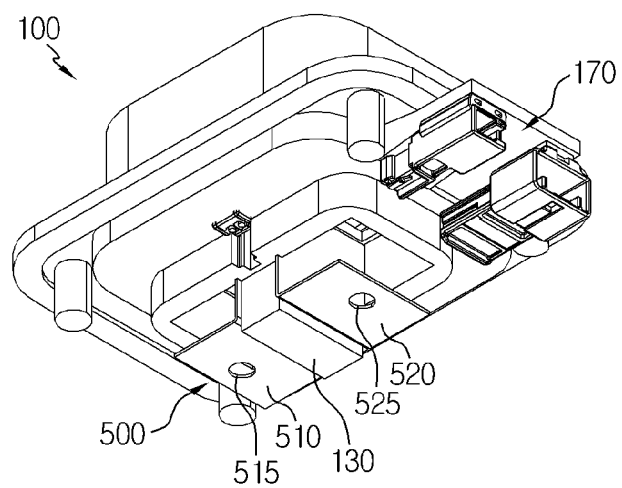
FIG. 4 is a perspective bottom view showing a plug body of the service plug of FIG. 3.
Figure 5:
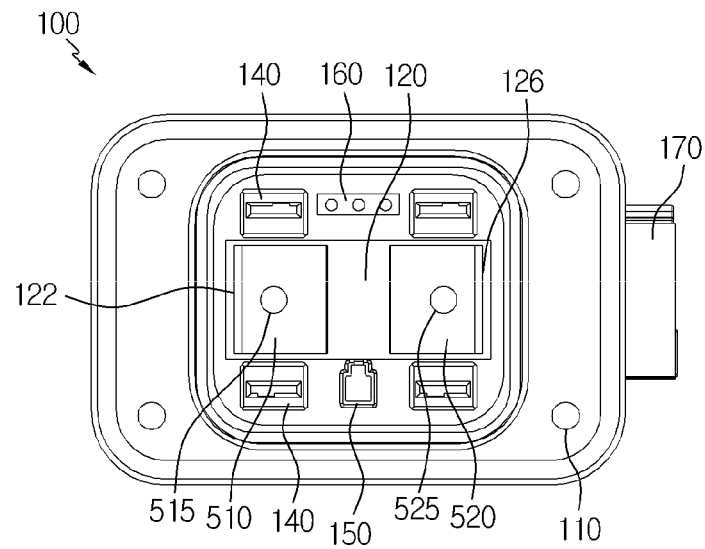
FIG. 5 is a plane view showing the plug body of FIG. 4.
Figure 6:
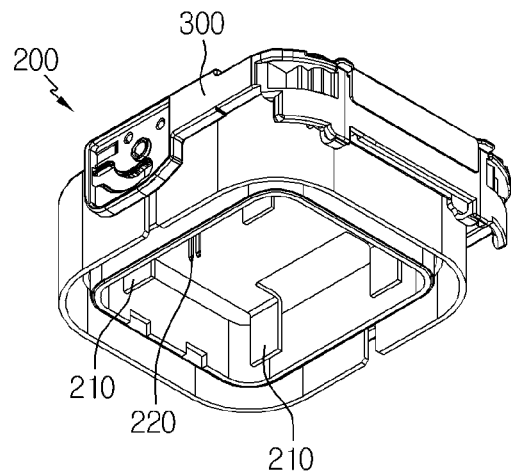
FIG. 6 is a perspective bottom view showing a plug cover of the service plug of FIG. 3.

FIG. 1 is a diagram for illustrating a battery pack according to an embodiment of the present disclosure, FIG. 2 is an exploded perspective view showing the battery pack of FIG. 1, from which a pack case is excluded, FIG. 3 is an exploded perspective view showing a service plug employed at the battery pack of FIG. 2, FIG. 4 is a perspective bottom view showing a plug body of the service plug of FIG. 3, FIG. 5 is a plane view showing the plug body of FIG. 4, and FIG. 6 is a perspective bottom view showing a plug cover of the service plug of FIG. 3.

Referring to FIGS. 1 to 6, a battery pack 1 may be provided to a vehicle as a fuel source of the vehicle. As an example, the battery pack 1 may be provided to an electric vehicle, a hybrid vehicle, a plug-in hybrid vehicle, and various vehicles capable of using the battery pack 1 as a fuel source.

In addition, the battery pack 1 may be provided in other devices, instruments or facilities such as an energy storage system using a battery cell as a secondary battery, in addition to the vehicle.

The battery pack 1 may include a pack case 10, a battery module assembly 20 and a service plug 80.

The pack case 10 may form an appearance of the battery pack 1 and accommodate various components of the battery pack 1. The pack case 10 may be mounted to a vehicle such as an electric vehicle, a hybrid vehicle and a plug-in hybrid vehicle, or a facility such as a power storage system.

The battery module assembly 20 may be provided inside the pack case 10 and include battery modules 30, 40, a module board 50 and a BMS board 70.

At least one battery module 30, 40 may be provided, and hereinafter, it is defined that a plurality of battery modules are provided in this embodiment.

Each of the plurality of battery modules 30, 40 may be a stack of a plurality of battery cells 35, 45. The plurality of battery cells 35, 45 may be pouch-type secondary batteries, and this is well known in the art and thus is not explained in detail here.

The module board 50 may electrically connect the plurality of battery modules 30, 40 and be mounted above the plurality of battery modules 30, 40. The module board 50 may include bus bar mounting parts 51, 56.

A plug bus bar 500, explained later, may be placed on the bus bar mounting parts 51, 56, and the bus bar mounting parts 51, 56 may include at least one protruding member 53, 58 provided through the plug bus bar 500 so as to be coupled to at least one coupling member S1, S2, explained later.

The bus bar mounting parts 51, 56 may include a first mounting part 51 and a second mounting part 56.

The first mounting part 51 may be provided at one side of the module board 50, and a first bus bar 510, explained later, may be placed thereon. The first mounting part 51 may include a first protruding member 53 provided through a first bus bar 510, explained later.

The second mounting part 56 may be spaced from the first mounting part 51 at one side of the module board 50, and a second bus bar 520, explained later, may be placed thereon. The second mounting part 56 may include a second protruding member 58 provided through a second bus bar 520, explained later.

The BMS board 70 is used for managing various electric components such as the battery modules 30, 40, the module board 50 and the battery module assembly 20, and may be provided inside the pack case 10. In detail, the BMS board 70 may be disposed at one side of the module board 50 inside the pack case 10.

The service plug 80 may be detachably connected to the battery module assembly 20 so as to electrically connect the battery module assembly 20 or cut off the electric connection of the battery module assembly 20 according to a user manual operation.

The service plug 80 may include a plug body 100, a plug cover 200, a plug lever 300 and a plug bus bar 500.

The plug body 100 may be mounted to the pack case 10. At this time, an upper portion of the plug body 100 may be disposed out of the pack case 10, and a lower portion of the plug body 100 may be disposed inside the pack case 10.

The plug body 100 may include a body coupling hole 110, a bus bar opening 120, a bus bar support 130, a connector slot 140, a high-voltage connector 150, a resistor connector 160 and a BMS connector 170.

The body coupling hole 110 is used for coupling the plug body 100 and the pack case 10 and may be provided in plural, each at four corners of the plug body 100. A screw member B fastened to the pack case 10 may be coupled through the plurality of body coupling holes 110, respectively.

The bus bar opening 120 may be provided above the plug bus bar 500, explained later and expose the plug bus bar 500 out of the pack case 10 when the plug cover 200 is separated. At least one coupling member S1, S2, explained later, may pass through the bus bar opening 120 when the plug bus bar 500, explained later, and the battery module assembly 20 are coupled.

The bus bar opening 120 may include a first open hole 122 and a second open hole 126.

The first open hole 122 may be provided above the first bus bar 510, explained later, and allow the first coupling member S1, explained later, to pass therethrough. The second open hole 126 may be provided above the second bus bar 520, explained later, and allow the second coupling member S2, explained later, to pass therethrough.

The bus bar support 130 may be provided between the first bus bar 510 and the second bus bar 520, explained later, and support the first bus bar 510 and the second bus bar 520. Accordingly, the first bus bar 510 and the second bus bar 520 may be stably supported inside the plug body 100 by means of the bus bar support 130.

The connector slots 140 may be disposed to face each other with the bus bar opening 120 being interposed therebetween and be electrically connected to the plug bus bar 500, explained later. The connector slots 140 may be provided in at least one pair. Hereinafter, in this embodiment, it is defined that two pairs of connector slots 140 are disposed to face each other with the first open hole 122 and the second open hole 126 being interposed therebetween.

The high-voltage connector 150 may spaced from the bus bar opening 120 and be disposed between the connector slots 140 at one side of the plug body 100. The high-voltage connector 150 may be electrically connected to the plug bus bar 500, similar to the connector slot 140.

The resistor connector 160 may be spaced from the bus bar opening 120 and be disposed to face the high-voltage connector 150 with the bus bar opening 120 being interposed therebetween. The resistor connector 160 may be connected to a resistance measuring unit for measuring insulation resistance of the battery module assembly 20 when the plug cover 200 is separated.

The BMS connector 170 may be provided at one side of the plug body 100 and be electrically connected to the BMS board 70. The BMS connector 170 may be disposed inside the pack case 10 when the plug body 100 is mounted.

The plug cover 200 may be detachably mounted to an upper portion of the plug body 100 so as to electrically connect the battery module assembly 20 when the plug cover 200 is coupled to the plug body 100 and to cut off the electric connection of the battery module assembly 20 when the plug cover 200 is separated from the plug body 100.

The plug cover 200 may include a connector terminal 210 and a high-voltage terminal 220.

The connector terminal 210 may be provided at a bottom of the plug cover 200 so as to inserted into the at least one pair of connector slots 140, in detail the two pairs of connector slots 140, when the plug cover 200 is coupled to the plug body 100, and to be removed from the at least one pair of connector slots 140, in detail the two pairs of connector slots 140, when the plug cover 200 is separated from the plug body 100.

The connector terminal 210 may be provided corresponding to the number of the connector slots 140, and in this embodiment, two pairs of connector terminals 210 may be provided corresponding to the two pairs of connector slots 140.

The high-voltage terminal 220 may be provided at the bottom of the plug cover 200 so as to be inserted into the high-voltage connector 150 when the plug cover 200 is coupled to the plug body 100 and to be separated from the high-voltage connector 150 when the plug cover 200 is separated from the plug body 100 or the plug lever 300, explained later, is pivoted.

The plug lever 300 may be pivotally mounted to the plug cover 200 and be capable of separating the high-voltage terminal 220 from the high-voltage connector 150 by means of the pivoting movement.

The plug bus bar 500 is used for the electric connection of the service plug 80 and the battery module assembly 20 and may be directly connected to the battery module assembly 20. The plug bus bar 500 may be provided at a lower portion of the plug body 100 and be exposed out of the pack case 10 when the plug cover 200 is separated.

The plug bus bar 500 may be directly coupled to the battery module assembly 20 by means of at least one coupling member S1, S2 without using a separate cable or wire. In detail, the plug bus bar 500 may be mounted directly to the module board 50 by means of the at least one coupling member S1, S2.

The plug bus bar 500 may include a first bus bar 510 and a second bus bar 520.

The first bus bar 510 may be provided at one lower side of the plug body 100 and be mounted to the bus bar mounting parts 51, 56. In detail, the first bus bar 510 may be mounted to the first mounting part 51 by means of the first coupling member S1.

The first bus bar 510 may have a through hole 515 through which the first protruding member 53 of the first mounting part 51 passes. The first protruding member 53 may be screwed with the first coupling member S1 after passing through the through hole 515. By coupling the first protruding member 53 and the first coupling member S1, the first bus bar 510 may be mounted to the first mounting part 51.

The second bus bar 520 may be installed at one lower side of the plug body 100 to be spaced from the first bus bar 510 by a predetermined distance and be mounted to the bus bar mounting parts 51, 56. In detail, the second bus bar 520 may be mounted to the second mounting part 56 by means of the second coupling member S2.

The second bus bar 520 may have a through hole 525 through which the second protruding member 58 of the second mounting part 56 passes. The second protruding member 58 may be screwed with the second coupling member S2 after passing through the through hole 525. By coupling the second protruding member 58 and the second coupling member S2, the second bus bar 520 may be mounted to the second mounting part 56.

Hereinafter, it will be explained in more detail that the service plug 80 is mounted to the battery pack 1.

Figure 7:
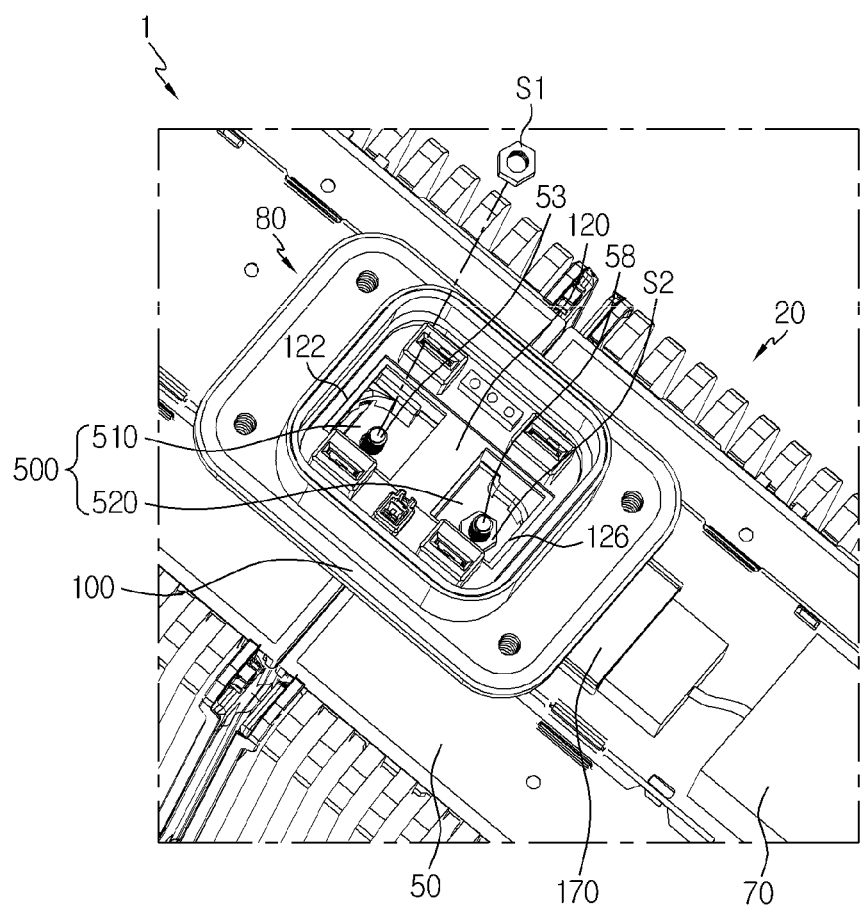
FIGS. 7 to 9 are diagrams for illustrating that the service plug is mounted to the battery pack of FIG. 1.
Figure 8:
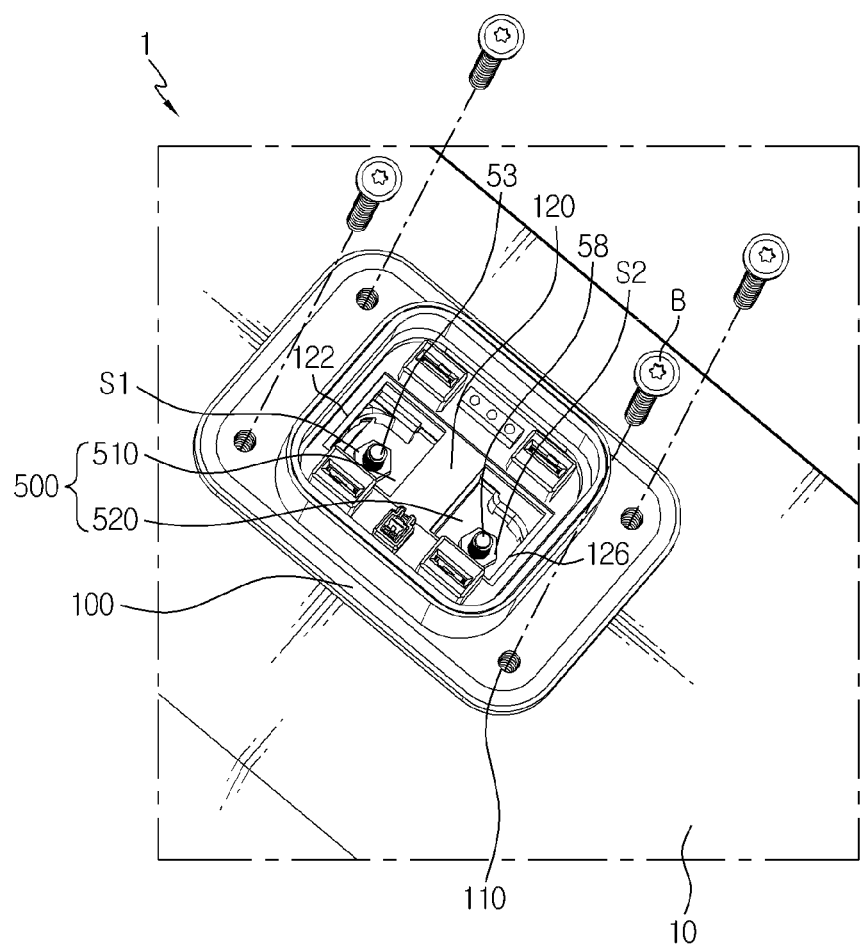
Figure 9:
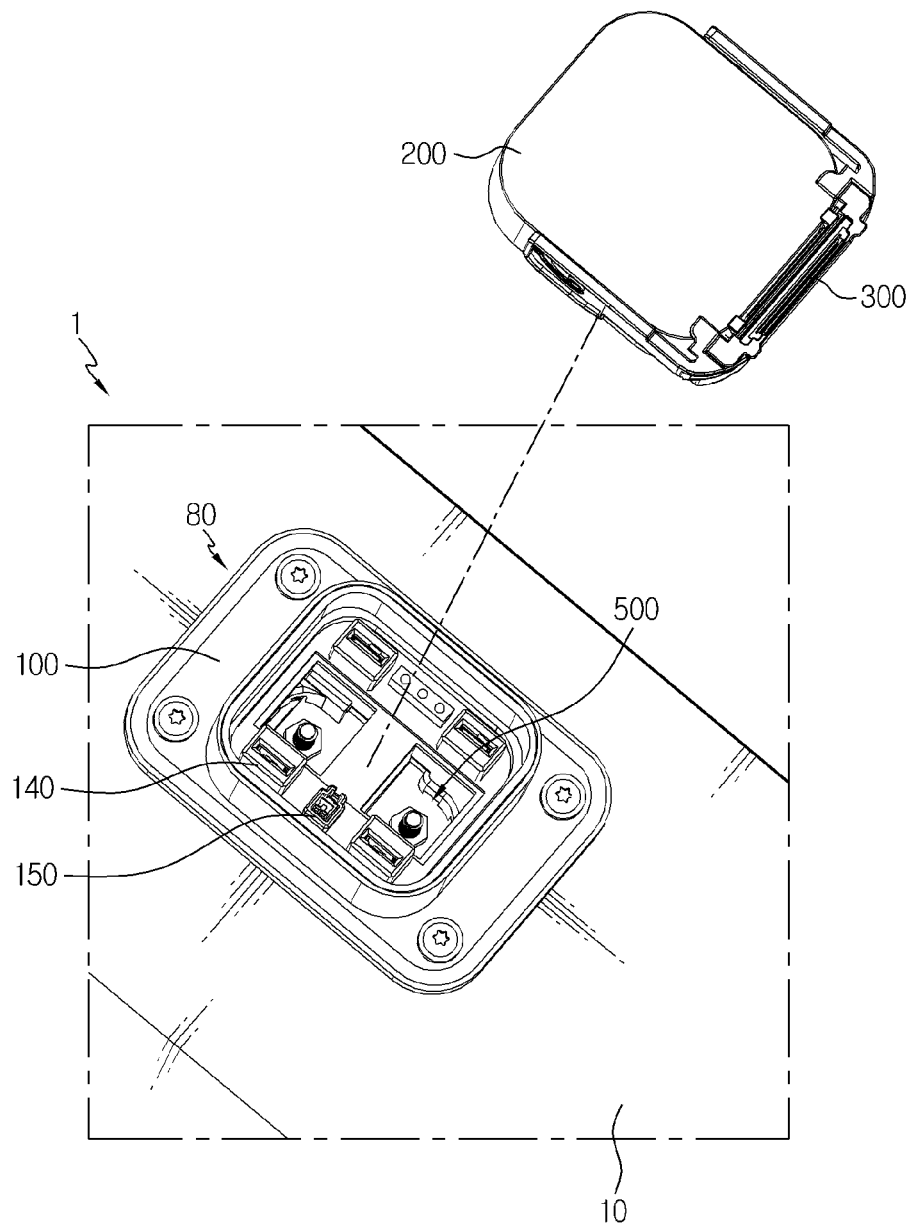

FIGS. 7 to 9 are diagrams for illustrating that the service plug is mounted to the battery pack of FIG. 1.

Referring to FIG. 7, when the service plug 80 is mounted, the plug body 100 may be mounted directly to the module board 50 of the battery module assembly 20. At this time, the plug bus bar 500 provided below the plug body 100 may be coupled to be electrically connected to the bus bar mounting parts 51, 56 (see FIG. 2). In addition, the BMS connector 170 provided at one side of the plug body 100 may be electrically connected to the BMS board 70.

Seeing the mounting configuration of the plug bus bar 500 in more detail, the first protruding member 53 may pass through the first bus bar 510 of the plug bus bar 500, and the second protruding member 58 may pass through the second bus bar 520 of the plug bus bar 500.

After that, a worker or the like may screw the first protruding member 53, which protrudes above the first bus bar 510, with the first coupling member 51 to electrically connect the first bus bar 510 and the first mounting part 51 (see FIG. 2). In addition, a worker or the like may screw the second protruding member 58, which protrudes above the second bus bar 520, with the second coupling member S2 to electrically connect the second bus bar 520 and the second mounting part 56 (see FIG. 2).

At this time, a worker or the like may move the first coupling member 51 and the second coupling member S2 for screwing to pass through the first open hole 122 and the second open hole 126 of the bus bar opening 120, respectively, and then screw them with the first protruding member 53 and the second protruding member 58, respectively.

Referring to FIG. 8, after that, a worker or the like may combine the plug body 100 with the pack case 10. In detail, a worker or the like may couple the plug body 100 to the pack case 10 by screwing a plurality of screw members B through the body coupling hole 110, respectively, and then coupling them to the pack case 10.

Meanwhile, the first coupling member Si and the second coupling member S2 may be coupled to the first protruding member 53 and the second protruding member 58 after the plug body 100 is coupled to the pack case 10.

In this embodiment, the first coupling member S1 and the second coupling member S2 for mounting the plug bus bar 500 pass through the first open hole 122 and the second open hole 126 of the bus bar opening 120 exposed out of the pack case 10, and then are coupled to the first protruding member 53 and the second protruding member 58. Thus, the plug bus bar 500 may be mounted to the battery module assembly 20 outside the pack case 10.

Therefore, in the battery pack 1 of this present embodiment, the assembling process for mounting the plug bus bar 500 may not be performed inside the battery pack 1, specifically inside the pack case 10, but be performed above the battery pack 1, specifically above the pack case 10. Thus, the assembling efficiency of the plug bus bar 500 may be improved greatly.

Moreover, in the battery pack 1 of this embodiment, the first coupling member Si and the second coupling member S2 for assembling the plug bus bar 500 may be screwed at any time before or after coupling the pack case 10 and the plug body 100. Thus, the assembling process may be performed more conveniently and efficiently.

Referring to FIG. 9, after that, a worker or the like may mount the plug cover 200 to the plug body 100. At this time, the connector terminals 210 and the high-voltage terminal 220 of the plug cover 200 may be inserted into and electrically connected to the connector slots 140 and the high-voltage connector 150 of the plug body 100, respectively. As the plug cover 200 is mounted to the plug body 100, the service plug 80 may be electrically connected to the battery module assembly 20.

Figure 10:
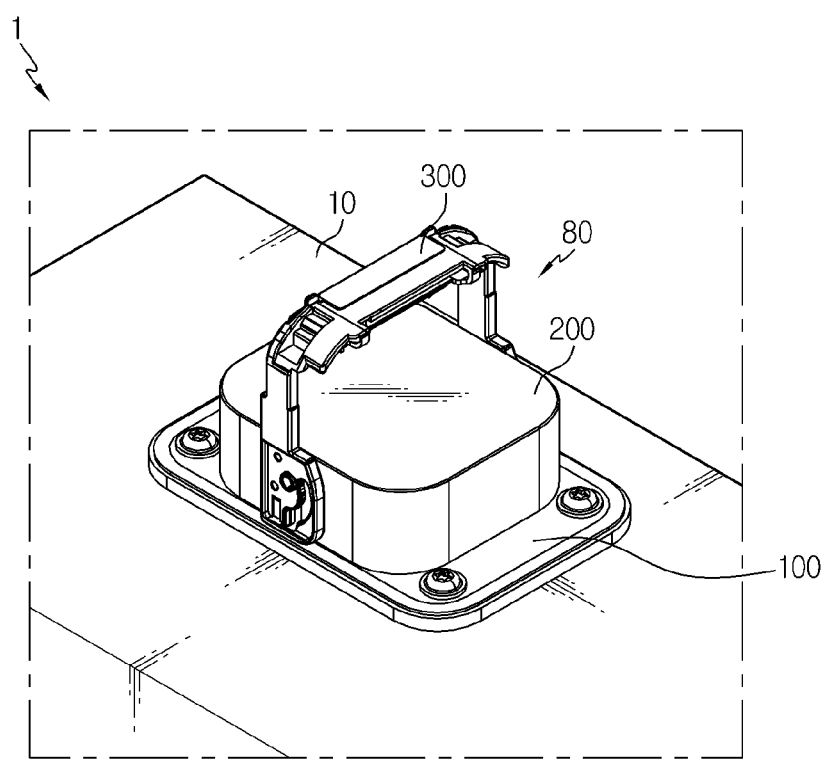
FIGS. 10 to 12 are diagrams for illustrating operations of the service plug of the battery pack of FIG. 1.
Figure 11:
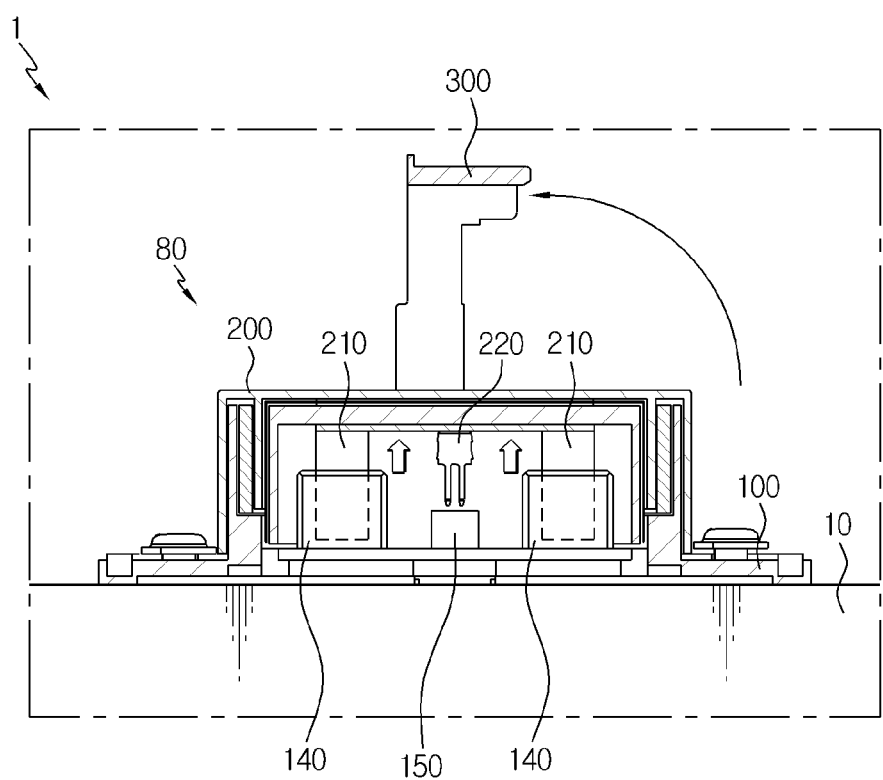
Figure 12:
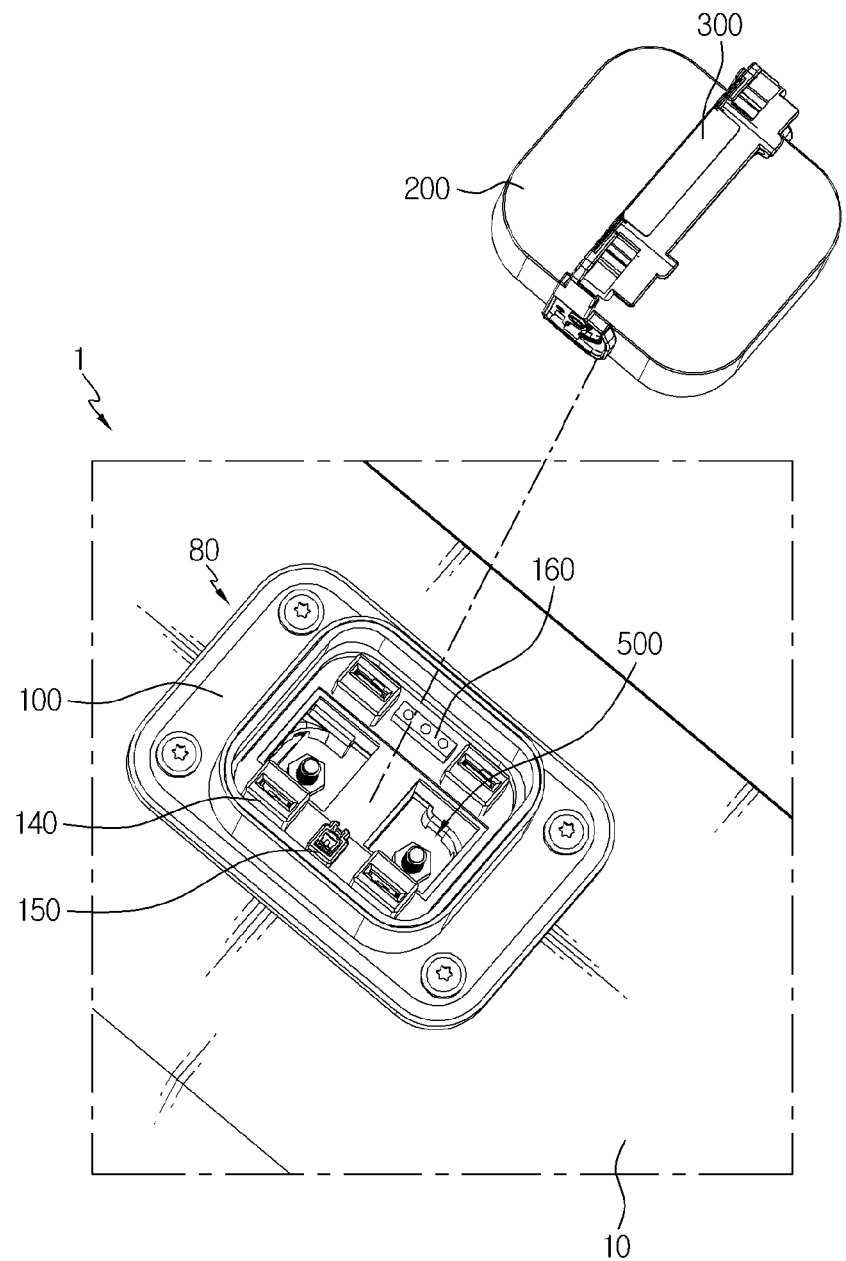

FIGS. 10 to 12 are diagrams for illustrating operations of the service plug of the battery pack of FIG. 1.

Referring to FIGS. 10 to 12, when inspecting or managing the battery pack 1, a worker or the like may firstly cut off the electric connection of the battery module assembly 20 of the battery pack 1 in order to prevent electric shock or other electric energy-related accidents.

For this, a worker or the like may separate the plug cover 200 of the service plug 80 from the plug body 100. At this time, the worker or the like may firstly pivot the plug lever 300 upwards. If the plug lever 300 is pivoted upwards, the high-voltage terminal 220 may be unplugged since it is separated from the high-voltage connector 150 of the plug body 100 according to the pivotal movement of the plug lever 300. Thus, the high-voltage connection of the battery module assembly 20 may be released preferentially. This is to reduce or eliminate an arc which may occur when the electric connection of the battery module assembly 20 is cut off.

After that, the worker or the like may completely separate the plug cover 200 from the plug body 100. At this time, the worker or the like may lift the plug lever 300 and completely separate the plug cover 200 from the plug body 100 more easily.

If the plug cover 200 is separated from the plug body 100, the connector terminals 210 of the plug cover 200 may be also separated from the connector slots 140 of the plug body 100 to completely cut off the electric connection of the battery module assembly 20.

Thereafter, the worker or the like may inspect or manage the battery pack 1 without the risk of electric shock or the like, in a state where the electric connection of the battery module assembly 20 of the battery pack 1 is cut off. For example, the worker or the like may measure the insulation resistance of the battery pack 1 by connecting the resistance measuring unit to the resistor connector 160 or check the overall conditions of the battery pack 1.

As described above, the battery pack 1 of this embodiment may be directly connected to the battery module assembly 20 by means of the plug bus bar 500 provided at the service plug 80 without using any separate cable, wire or component, when the service plug 80 is mounted to the pack case 10.

Thus, the battery pack 1 of this embodiment may greatly improve the efficiency of the assembling process when the service plug 80 is mounted to the battery pack 1.

Moreover, the battery pack 1 of this embodiment does not require additional components such as a separate cable for mounting the service plug 80, and thus it is possible to prevent an additional increase of the manufacturing cost due to these components, thereby ensuring price competitiveness of the battery pack 1.

In addition, the battery pack 1 of this embodiment does not require an additional space for mounting the additional components in the pack case 10, thereby improving the space efficiency in the pack case 10.

Therefore, the battery pack 1 of this embodiment may ensure a maximized accommodation space for the battery cells 35, 45 of the battery module assembly 20 inside the pack case 10, and thus the energy density of the battery pack 1 may be greatly increased with the same size. Accordingly, in the battery pack 1 of this embodiment, the capacity and output of the battery pack 1 may be greatly increased with the same size.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
a pack case forming an appearance of the battery pack;
a battery module assembly provided in the pack case and having at least one battery module; and
a service plug configured to electrically connect the battery module assembly or cut off the electric connection of the battery module assembly, the service plug having a plug bus bar directly connected to the battery module assembly, the service plug including:
a plug body mounted to the pack case, the plug bus bar being provided at a lower portion of the plug body; and
a plug cover detachably mounted to the plug body,
wherein the plug body has a bus bar opening provided above the plug bus bar to expose the plug bus bar when the plug cover is separated,
wherein the plug bus bar is coupled to the battery module assembly by means of at least one coupling member, and
wherein the at least one coupling member passes through the bus bar opening when the plug bus bar and the battery module assembly are coupled.

2. The battery pack according to claim 1,
wherein the plug body is mounted to the pack case so that an upper portion thereof is disposed out of the pack case and a lower portion thereof is disposed inside the pack case, and
wherein the plug cover is detachably mounted to the upper portion of the plug body, the plug cover electrically connects the battery module assembly when being coupled to the plug body and cuts the electric connection of the battery module assembly when being separated from the plug body, and
wherein the plug bus bar is exposed out of the pack case when the plug cover is separated.

3. The battery pack according to claim 1,
wherein the battery module assembly includes a module board for electrically connecting the at least one battery module, and
wherein the plug bus bar is mounted directly to the module board.

4. The battery pack according to claim 3,
wherein the module board includes a bus bar mounting part on which the plug bus bar is placed, and the bus bar mounting part has at least one protruding member provided through the plug bus bar so as to be coupled to the at least one coupling member.

5. The battery pack according to claim 4,
wherein the plug bus bar includes:
a first bus bar provided at one lower side of the plug body and mounted to the bus bar mounting part; and
a second bus bar spaced from the first bus bar by a predetermined distance and mounted to the bus bar mounting part.

6. The battery pack according to claim 5,
wherein the bus bar mounting part includes:
a first mounting part on which the first bus bar is placed, the first mounting part having a first protruding member provided through the first bus bar; and
a second mounting part on which the second bus bar is placed, the second mounting having a second protruding member provided through the second bus bar.

7. The battery pack according to claim 6,
wherein the coupling member is provided in a pair, and
wherein the pair of coupling members include:
a first coupling member coupled to the first protruding member; and
a second coupling member coupled to the second protruding member.

8. The battery pack according to claim 7,
wherein the bus bar opening includes:
a first open hole provided above the first bus bar and allowing the first coupling member to pass therethrough; and a second open hole provided above the second bus bar and allowing the second coupling member to pass therethrough.

9. The battery pack according to claim 6,
wherein the first bus bar has a through hole through which the first protruding member passes, and
wherein the second bus bar has a through hole through which the second protruding member passes.

10. The battery pack according to claim 5,
wherein the plug body includes a bus bar support provided between the first bus bar and the second bus bar to support the first bus bar and the second bus bar.

11. The battery pack according to claim 1,
wherein the plug body includes at least one pair of connector slots disposed to face each other with the bus bar opening being interposed therebetween and electrically connected to the plug bus bar.

12. The battery pack according to claim 11,
wherein the plug cover includes at least one pair of connector terminals inserted into the at least one pair of connector slots when the plug cover is coupled to the plug body and detached from the at least one pair of connector slots when the plug cover is separated from the plug body.

13. The battery pack according to claim 1,
wherein the plug body includes a high-voltage connector spaced from the bus bar opening and electrically connected to the plug bus bar.

14. The battery pack according to claim 13,
wherein the plug cover includes a high-voltage terminal inserted into the high-voltage connector when the plug cover is coupled to the plug body.

15. The battery pack according to claim 14,
wherein the service plug includes a plug lever pivotally mounted to the plug cover to separate the high-voltage terminal from the high-voltage connector by the pivotal movement.

16. The battery pack according to claim 1,
wherein the plug body includes a resistor connector spaced from the bus bar opening to measure insulation resistance of the battery module assembly when the plug body is separated from the plug cover.

17. The battery pack according to claim 3
wherein the battery module assembly includes a BMS board provided in the pack case to manage the at least one battery module and the module board, and
wherein the plug body includes a BMS connector electrically connected to the BMS board and disposed inside the pack case.

18. A vehicle, comprising the battery pack defined in claim 1.

* * * * *